Feb. 23, 1971   P. HIRSCH   3,565,642
COOKING APPLIANCE
Filed April 12, 1968   3 Sheets-Sheet 1
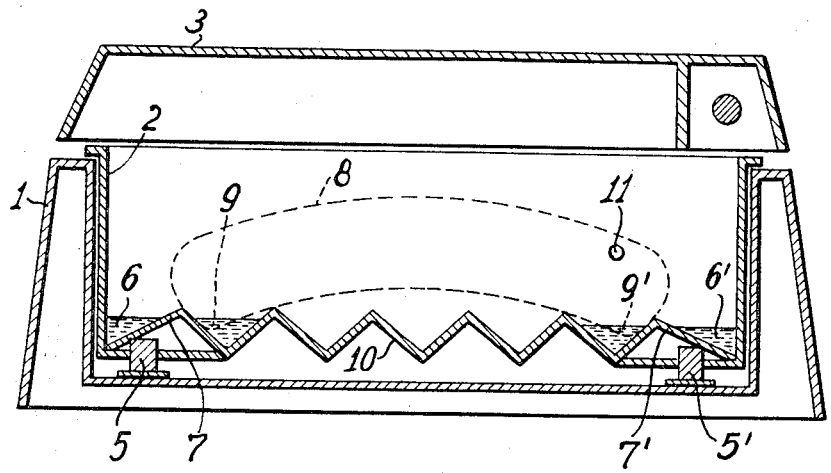
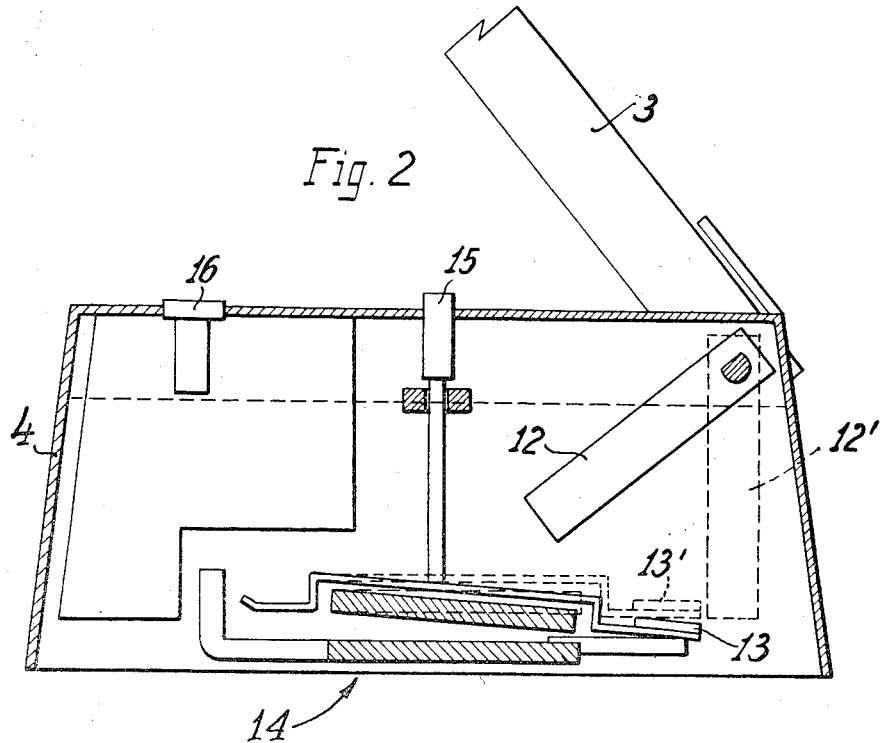

Feb. 23, 1971 P. HIRSCH 3,565,642
COOKING APPLIANCE
Filed April 12, 1968 3 Sheets-Sheet 2
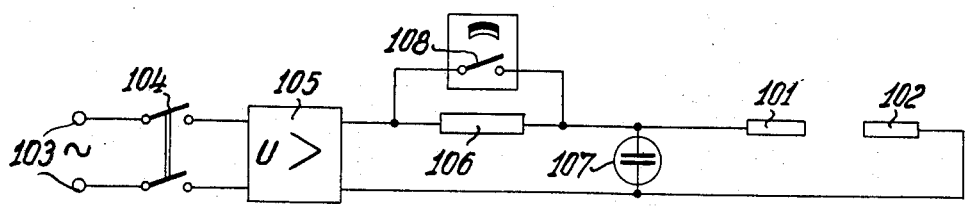
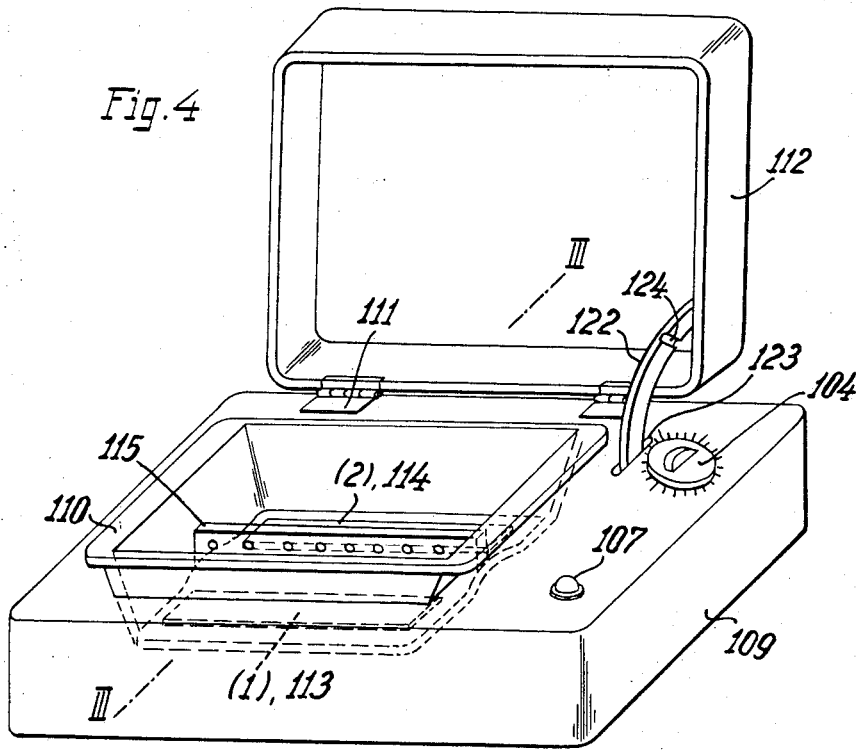

Feb. 23, 1971   P. HIRSCH   3,565,642
COOKING APPLIANCE
Filed April 12, 1968   3 Sheets-Sheet 3

United States Patent Office 3,565,642
Patented Feb. 23, 1971

3,565,642
COOKING APPLIANCE
Paul Hirsch, Heubergg. 9,
Vienna 1170, Austria
Filed Apr. 12, 1968, Ser. No. 720,761
Int. Cl. H05b 7/06
U.S. Cl. 99—358                                 14 Claims

ABSTRACT OF THE DISCLOSURE

A cooking appliance for food whereby the food is placed in a container between two electrolyte baths which are connected to a source of electrical potential by a pair of electrodes, preferably via a first and second resilient contact which is inserted into holes provided in the bottom of the container. The appliance is also preferably provided with a safety device for locking the lid during cooking, and the container is preferably removably mounted in a support base which contains the current supply conductors.

---

Figure 5:
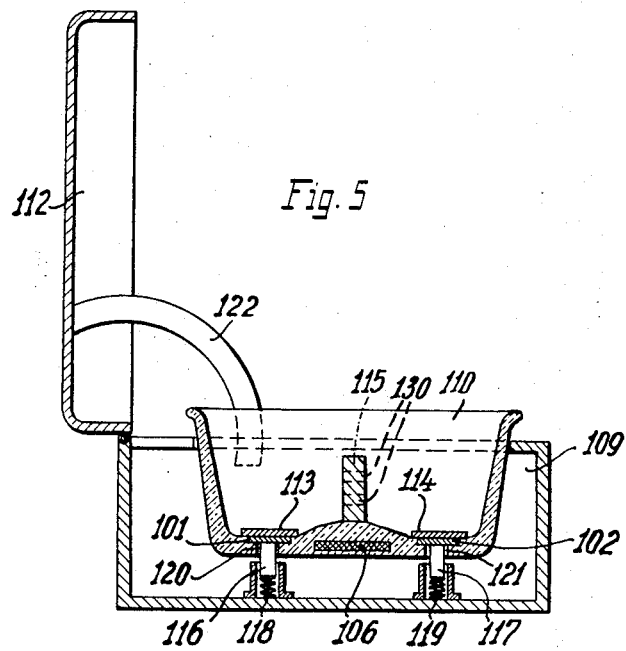

The invention relates to a cooking appliance for food having a cooking container receiving the goods to be cooked. A cooking appliance has already become known, wherein two electrodes connected to a source of current are provided in the cooking container, so that after switching on the current, the current is passed via the electrodes through the food to be cooked. The food to be cooked acts then as an electrical resistance, so that immediate heating of the food to be cooked is effected by the current flowing through it. Since in such a cooking appliance the heat losses usually occurring on heat transfer from the flame to the container and from the container to the food to be cooked are eliminated, such a cooking appliance has a very high coefficient of efficiency.

The known cooking appliances of this kind had, however, numerous disadvantages. In the known cooking appliances the food to be cooked was generally clamped between two electrodes so that these electrodes had to be constructed slidably relative to each other. Such an arrangement was accordingly of expensive construction and moreover difficult to clean.

The present invention has the object of overcoming the aforesaid difficulties, and to provide a simple cooking appliance which is absolutely reliable in operation. For this purpose at least two electrolyte baths are provided in the cooking container, to which current is supplied via the electrodes and into which the ends of the food to be cooked are dipped. Moreover, the container receiving the food to be cooked is covered by a lid co-operating with a safety device, the said safety device effecting interruption of the circuit leading to the electrolyte baths for cooking when the lid is in the open position. Such a cooking appliance is simple to produce and absolutely reliable, since on the one hand the electrolyte baths constitute a safe connection of the circuit between the electrodes and the goods to be cooked, and on the other hand by the safety device, which prevents a removal of the lid covering the cooking container during the cooking operation: any contacting of the food to be cooked is prevented with safety as long as the same is under a voltage. Since the food to be cooked can be placed under a voltage only while the lid is closed, accidents resulting from touching the current-carrying components are absolutely precluded.

In order to prevent any direct connection between the electrolyte baths, by-passing the food to be cooked, even with a comparatively high liquid level in the cooking container, projections are provided on the bottom of the container between the electrolyte baths. These projections extend even at a comparatively high liquid level in the cooking container beyond the surface of the liquid and thus divide the liquid, so that a direct circuit through this liquid is obviated.

The safety device comprises an electromagnet, which is preferably constructed as a switch relay, which locks the lid against being swung up when the cooking circuit is switched on, preferably by means of a lever fixedly connected to the lid. Thus in a single way any opening of the lid is prevented while the cooking circuit is switched on, and any contacting of the current-carrying food to be cooked is obviated. When the electromagnet used is constructed at the same time as a relay for switching on and off the cooking circuit, a single structural component may be sufficient, and no separate circuit is required for locking the lid by the electromagnet provided therefor.

To this relay, a heat feeler may be connected, which can be inserted into the food to be cooked and which upon reaching a predetermined temperature interrupts the cooking circuit through the relay and at the same time releases the lock of the lid of the cooking appliance. In order to be able to effect the switching off of the cooking appliance and release of the locking independently of this heat feeler, a push button may be provided effecting such switching off.

The electrodes, which are preferably constructed flat, may be embedded in the bottom of the container in such a way, that they are flush with the inner surface thereof and that the locking of the lid is effected by a time switch for adjusting the cooking period. The electrodes are accordingly nowhere protruding beyond the bottom of the container, but are arranged flush with the surface of the bottom of the container, so that the shape of the cooking container corresponds to the shape of a usual cooking pan, for example made of refractory glass or ceramics.

By effecting the locking of the cooking container in dependence of a time switch for adjusting the cooking period, any touching of the food to be cooked by the cook during the cooking process is prevented in a simple way and without any special auxiliary means, so that the cooking appliance is absolutely safe in operation. Conveniently the cooking container is arranged removably in a support containing the time switch and the current supply leads. Accordingly, after the termination of the cooking operation the cooking container may be lifted off the support and may be used for serving at once like an ordinary cooking dish. Moreover it is possible, to carry out the cleaning of the cooking container separately from the cleaning of the support containing the electric switching device. Thus, the cooking container may be rinsed like a usual cooking pan or pot, while the support in general does not require any cleaning and has to be wiped at the worst with a moist rag. In order to permit the removal of the cooking container from the support base, the arrangement is made in such a manner, that the supply of current to the electrodes is effected by resilient contacts arranged in the support base, which contacts may be introduced into holes provided on the outside of the bottom of the container. By inserting the cooking container into an opening provided in the support base, the resilient contacts fit automatically into the holes in the bottom of the container leading to the electrodes. Alternately an electrically conductive bottom can be connected to the electrodes, so that a current supply to the electrodes is safeguarded when inserting the cooking applicance into the support base.

Preferably the electrodes are cast into the bottom of a cooking container consisting of glass or of synthetic material. It is then convenient for the bottom to have in the interior of the cooking container recesses of a profile converging upwardly of trapezium shape through which the material of the electrode penetrates to the surface. In this manner the effective surface of the electrodes coming into contact with the food to be cooked can be determined in a simple way. Because of the trapezoidal or conical shaping of the cross sections of the recesses, congestions of the current are prevented. Limitation of the current can be moreover effected by covering the electrodes on their surfaces in contact with the food to be cooked by a removable diaphragm. Such a diaphragm is preferably constructed of a porous material such as chamotte, silica or the like and acts independently of the salt content as a limitation of the current by the formation of bubbles on the diaphragm. Moreover a diaphragm may be arranged in a vertical position between the two electrodes on the side walls of the container, preferably by clamping. When such a diaphragm is provided, the cooking effect begins on the surface of this diaphragm, and such a diaphragm not only effects a limitation of the current, but prevents also unintentional electro-chemical processes during the cooking operation. This diaphragm may have holes, which are so dimensioned, that the current intensities desired are attained.

For the purpose of locking the lid of the container, the lid has an extension projecting downwardly, with which a wheel co-operates which can be turned by the time switch. In this manner the lid can be lifted only, when the time switch is in a certain position, namely the zero position. This projection has according to a feature of the invention a groove in which engages the edge of the wheel, which can be turned by the time switch, this wheel having a cut-out releasing the projection in the zero position of the time switch.

Conveniently a series resistor may be connected into the electrode circuit. When such a series resistor is provided, it is advantageous to embed the same into the bottom of the container, whereby the heat generated in this series resistor contributes to the heating of the food to be cooked. It is not necessary to keep this series resistor constantly connected, but this resistor has the object of effecting a limitation of the current when the current intensity rises unduly. For this reason the series resistor is conveniently bridged by a temperature-controlled switch, for example a bi-metal switch, which opens when a predetermined temperature is exceeded.

Moreover a glow discharge lamp may be connected between the two electrodes whose brightness constitutes an approximate measure of the salt content of the food to be cooked.

The cooking process is conducted for example in the following manner: in a dish in which flush electrodes are embedded an alternating current is directly switched on. Liquid or solid food is inserted between the electrodes and is subjected to the passage of current after closing the lid. The food enriched by a slight salt content is brought to the desired degree of temperature by resistance heating. A switch is provided, by means of which a resistor is connected into the circuit, when a certain electrical load, e.g. of 8 amps is reached, and which ensures a maximum nominal value of e.g. 10 amps upon total short circuiting of the electrodes. In such a case the food to be cooked is heated or cooked exclusively by the heat radiated from the resistor.

The permissible maximum temperature at the nominal load of 10 amps may be adjusted by corresponding dimensioning of the heating wire as regards cross-sectional area and length; it also depends on the properties of the material and the problems of heat transfer. Temperatures of up to 800° C. would be the most suitable. As a material for the heating coil, Kanthal registered trademark for a high electrical resistance alloy or tantalum wires can be used.

The danger of overheating the casing which is made of synthetic material persists and the heat transfer from the heating plate to the pan somewhat deteriorates the material. On the whole, the advantages of the arrangement described last would be predominant.

Finally, it should be remarked, that by means of this construction the nominal current intensity of 10 amps can be attainted only when preparing strongly salted liquid food, and that then a considerable speeding-up of the heating of the food to be cooked is attained by the additional heating plate, in addition to the current-limiting action thereof.

An additional current-limiting heating coil of Kanthal wire can be provided.

In order to limit the current intensity to 10 amps, according to ohm's law the heating conductor must have a resistance of 22 ohms at the temperature desired, upon connection to the usual mains having a voltage of 220 volts. The temprature chosen of about 800° C. at a current intensity of 10 amps requires corresponding dimensioning of the wire as regards its length and diameter. The data raquired can be taken from the Kanthal hand book. The electric output of this coil amounts to 2200 watts.

In operation of the appliances, the resistance of the food to be cooked is added to that of the heating wire. Since the resistance of the salted liquids considerably diminishes only at elevated temperature, the current intensities which occur at the beginning of the process are so low that consequently a reduction of the resistance of the series resistor has been found necessary. Tests have shown, that even strongly salted soups of an amount of 1 litre have at boiling temperature a resistance of 12 ohms which suffices for the required current limitation. The latter is, however, not absolutely effective in this case, i.e. no liquids must be used, the resistance of which is lower than 10 ohms.

Besides, in modification of the possible arrangements set forth hereinabove, there remains always the optional switching-on or-off of the current-limiting resistor by building-in a suitable switch.

In the drawing, FIGS. 1 and 2 show sections of the cooking appliance, namely FIG. 1 a section of the cooking container, and FIG. 2 a section of the casing, which houses the switching means.

Figure 6:
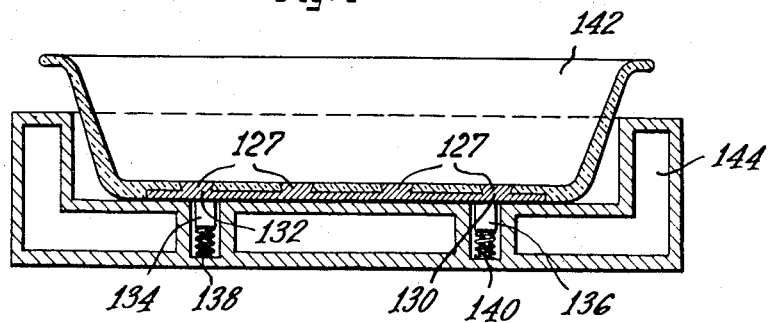
Figure 7:
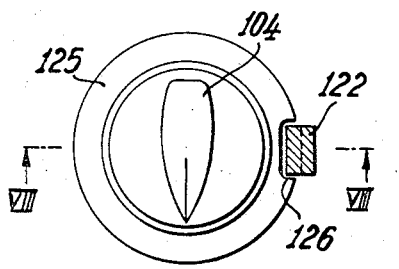
Figure 8:
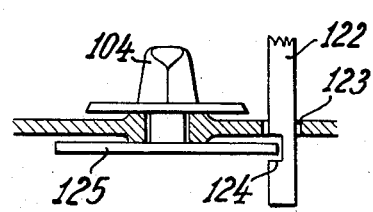

FIG. 3 shows the circuit diagram to be the cooking appliance according to the invention. FIG. 4 is the perspective view of the cooking appliance. FIG. 5 is the section of the line III–III' of FIG. 4. FIG. 6 shows another embodiment of cooking device according to the invention in which the electrodes only partly reach the surface of the container bottom. FIG. 7 shows a plane view of the locking device for the lid. FIG. 8 shows a section on the line VIII–VIII' of FIG. 7.

In the bottom portion of the support base 1 electrodes 5, 5' are provided in the region of the cooking container, which serve for the supply of the cooking current and can be inserted into recesses provided on the bottom of the cooking container 2. When the cooking container 2 is inserted, the electrodes 5, 5' come into contact with contact plates 7, 7' forming a boundary wall for recesses provided in the cooking container 2 wherein electrolyte baths 6, 6' are provided. The food to be cooked 8, which for example consists of a sausage, is inserted into the cooking container 2 in such a manner that the two ends 9, 9' of the food to be cooked dip into the electrolyte containers 6, 6', whereby a conductive connection is established by the food to be cooked between the two electrolyte baths. The food to be cooked thus serves as an electric resistance, and the current flowing through this food to be cooked causes direct heating of the food to be cooked. In order to prevent the formation of creep currents and the conduction of current between the two electrolyte baths 6, 6' by passing the food to be cooked, 8, the bottom of the cooking container 2 is provided with projections 10.

In the food 8 to be cooked, a thermal feeler 11 is inserted, which survey the cooking process and interrupts the cooking circuit. when a predetermined cooking temperature is reached.

In order to prevent any contacting of the current-conducting food to be cooked during the cooking process a safety device is provided which co-operates with the lid 3. As will be seen in FIG. 2, a lever 12 is rigidly connected to the lid 3, which in the closed condition of the lid 3 is in a position 12'. An abutment 13 actuated by an electro-maget 14 co-operates with the lever 12. When the food to be cooked is under voltage the abutment 13 is swung by the electromagnet 14 into the position 13', in which locking of the lever 12 is effected in a position 12', and thus also of the lid 3 in the locked position.

The electromagnet 14 may conveniently function as a relay switch so that the current supply of the electrolyte baths 6, 6' depends on the position of the electromagnet 14 and accordingly also on the position of the abutment 13.

The electromagnet constructed as a relay switch is controlled by the thermal feeler 11, which interrupts the cooking process as soon as the temperature of the food to be cooked has reached a certain value. Moreover the electromagnet constructed as a relay swich may also be actuated by a push button 15, by means of which an interruption of the cooking current may be effected at will. Accordingly, the lid 3 can be opened only, when the cooking process is interrupted, since the abutment 13 is always in the path of movement of the lever 12 during a current supply to the electrolyte baths 6, 6'.

An indicator lamp 16 is connected into the cooking circuit by means of which it indicated, whether the electrolyte baths 6, 6' are supplied with current or not, i.e. whether the cooking process is already terminated or not.

FIGS. 3–5 and 7 and 8 of the drawings related to a further embodiment of the invention. FIG. 3 shows the circuit diagram of a cooking appliance according to the invention, and FIG. 4 is a perspective view of the cooking appliance, FIG. 5 is a section of the line III–III' of FIG. 4. FIG. 6 shows yet another embodiment of a cooking appliance according to the invention, in which the electrodes reach the surface of the container bottom but partly, in a section parallel to the electrodes. FIGS. 7 and 8 show the locking device for the lid, FIG. 7 being a plan view and FIG. 8 being a section on the line VIII–VIII' of FIG. 7.

As will be clear from the circuit diagram illustrated in FIG. 3, the electrodes 101 and 102 consisting preferably of carbon or electrode graphite, but alternatively salt electrodes are supplied from a source of alternating current of a frequency of at least 50 c.p.s. through terminals 103. The use of metal electrodes is undesirable for reasons of health. In the electrode circuit a switch 104 is connected, a switch 105 for protection against excess voltage, a series resistor 106 and a glow discharge lamp 107. The series resistor is bridged by a bi-metal switch 108, which opens only upon exceeding a permissible temperature and accordingly, upon reaching a non-permissible increase of current intensity, so that the series resistor is connected into the circuit upon that occurrence only. Instead of a bi-metal switch any other current-responsive switch may be used. The glow discharge lamp is shunted parallel to the electrodes 101 and 102, and the brightness of this glow discharge lamp 107 increases with a rising salt content of the food to be cooked, so that the glow discharge lamp allows one to ascertain the approximate salt content thereof.

As will be seen in FIGS. 4 and 5, the cooking appliance comprises a support base 109, wherein the container for the food to be cooked, 110, of refractory glass, ceramics or synthetic material is inserted removably. The container for the food to be cooked, 110, can be covered by a lid 112, which is connected to the support base 109 through hinges 111.

In the bottom of the cooking container 110 the two electrodes 101 and 102 are embedded, so that they do not project beyond the bottom surface therof. These electrodes may be covered by a diaphragm 113 or 114 for the purpose of limiting the passage of current. Moreover, between the two electrodes 101 and 102 a removable diaphragm 115 may be provided which is preferably clamped to a side wall of the cooking container. By this diaphragm, on whose surface the cooking process begins, there occurs likewise a limitation of the current independently of the salt content of the food to be cooked. In order to determine the current intensity desired, holes 130 are provided in this diaphragm.

The bottom of the cooking container 110 is preferably cambered between the electrodes, so that the electrodes lie in depression of the container bottom. When only a small volume of liquid is filled into the container, this liquid collects in the two depressions, so that electrolytical baths are formed there, into which for example the ends of a sausage to be cooked may be dipped. However, when more liquid is filled in, the circuit is closed through the liquid, so that heating of the liquid and of any solid constitutents contained therein takes place.

In the bottom of the support base 109 contacts 116 and 117 are provided, which are connected to a current supply through springs 118 and 119. When the cooking container 110 is inserted into the support base 109, the contacts 116 and 117 pass through recesses 120 and 121 on the outside of the container bottom and electrically connect to electrodes 101 and 102, so that these electrodes are supplied with current by the resilient contact pressure of the contacts 116 and 117. In the bottom of the container 110 there is moreover arranged the series resistor 106.

In the support base 109 there are located the fittings for the current supply to the electrodes. In particular, the glow discharge lamp 107 as well as the switch 104 formed as a time switch are arranged in this support base. By means of this time switch 104 the cooking period can be adjusted, which amounts for example to 14–18 secs. for sausages taken from a refrigerator, and approximately 30 secs. for preserves. The time switch 104 serves at the same time for locking the lid 112. For this purpose the lid 112 is provided with an extension 122, which engages in a slot 123 of the support base 109 and, as shown in FIGS. 7 and 8, has a groove 124, in which engages a wheel 125, which can be turned by the time switch 104 and is preferably mounted on the same shaft with the latter. This wheel 125 has a cut-out 126, by which the extension 122 is released in the zero position of the time switch 104. By this arrangement any turning of the time switch and accordingly any switching on of the circuit can take place only when the lid is closed, and this lid 112 can be reopened only, when the time switch has reached its zero position. Thus any contact with the current-carrying food to be cooked is safely prevented.

In FIG. 6 an embodiment is illustrated, wherein the electrodes 130 and 132 which are similar to electrodes 101 and 102 are not in contact over their entire length with the food to be cooked, but wherein the bottom 144 of the cooking container 142 has on its inside recesses of trapzeium shaped profile converging upwardly, so that part 127 only of this electrode material reaches the surface. In this manner the surface area can be limited to the size desired as required for the passage of the current. The current supply to the electrodes takes place likewise through contacts 134 and 136 resting on springs 138 and 140, respectively. It is possible also in this embodiment to cover the surface of the electrodes in contact with the food to be cooked by a diaphragm.

The support base 109 as well as the lid 112 of the cooking appliance are made of synthetic material, so that safe protection against contact is achieved by insulation of the casing.

I claim:

1. A cooking appliance for food having a container for receiving the food to be cooked wherein at least two electrodes of flat shape are provided in the bottom of the container flush with the inner surface of the bottom for the supply of current to the food to be cooked, characterized in that in the cooking container at least two electrolyte baths are provided, which are supplied with current through the electrodes and into which the ends of the food to be cooked are dipped, in that the container receiving the food to be cooked is covered by a lid cooperating with a safety device, this safety device effecting locking of said lid during cooking for a given adjustable time period in dependence upon a time switch for adjusting the cooking period and in that the supply of current to the electrodes is effected through resilient contacts arranged in the support base which are capable of being inserted into holes provided on the outside of the container bottom.

2. A cooking appliance according to the claim 1, characterized in that the electrodes are cast into the bottom of the cooking container, which consists of glass or synthetic material.

3. A cooking appliance for food having a container for receiving the food to be cooked wherein at least two electrodes associated with said container are provided for the supply of current to the food to be cooked, characterized in that in the cooking container at least two electrolyte baths are provided, which are supplied with current through the electrodes and into which the ends of the food to be cooked are dipped, in that the container receiving the food to be cooked is covered by a lid cooperating with a safety device, this safety device effecting locking of said lid during cooking for a given adjustable time period and in that the electrodes are each covered by a removable diaphragm on its surface.

4. A cooking appliance for food having a container for receiving the food to be cooked wherein at least two electrodes associated with said container are provided for the supply of current to the food to be cooked, characterized in that in the cooking container at least two electrolyte baths are provided, which are supplied with current through the electrodes and into which the ends of the food to be cooked are dipped, in that the container receiving the food to be cooked is covered by a lid cooperating with a safety device, this safety device effecting locking of said lid during cooking for a given adjustable time period and in that between the electrodes a diaphragm is arranged perpendicular to the bottom and attached to the side wall.

5. A cooking appliance according to claim 4, characterized in that the extension of the lid of the container has a groove in which engages the edge of the wheel rotatably by the time switch, and that this wheel has a cut-out releasing the extension in the zero position of the time switch.

6. A cooking appliance according to claim 4, characterized in that the diaphragm is provided with holes.

7. A cooking appliance according to claim 6, characterized in that the lid of the container has an extension projecting downwardly which co-operates with a circular disc rotatable by the time switch.

8. A cooking appliance according to claim 6, characterized in that a series resistor is connected into the electrode circuit.

9. A cooking appliance according to claim 8, characterized in that the series resistor is embedded in the bottom of the container.

10. A cooking appliance according to claim 9, characterized in that the series resistor is bridged by a temperature-controlled switch, for example a bi-metal switch which opens when a predetermined temperature is exceeded.

11. A cooking appliance according to claim 10, characterized in that a glow discharge lamp is connected between the two electrodes.

12. A heating appliance for food comprising:
container means for receiving the food to be heated,
a first and second resilient contact inserted into holes provided in the bottom of said container means,
a pair of electrodes adapted to be connected to a source of electrical energy via said first and second contacts for heating said food and associated with said container means, and
means within said container for confining a first and second electrolyte bath, each of said baths being electrically connected to one of said electrodes so that said food is heated when a portion of said food is placed in each of said baths.

13. An appliance as in claim 12 including lid means attached to said container and having an open position for placing food within said container and a closed position and means for preventing said electrodes from being connected to said source of electrical energy when said lid is in said open position.

14. An appliance as in claim 12 including lid means attached to said container and having an open position for placing food within said container and a closed position and means for preventing said lid means from assuming said open position for a given time after said food is placed in said container and said lid means moved to said closed position.

References Cited

UNITED STATES PATENTS

| 2,025,085 | 12/1935 | Berkeley | 99—358 |
|---|---|---|---|
| 2,274,325 | 2/1942 | Ford | 99—337 |
| 2,405,984 | 8/1946 | Sharpe | 99—358 |
| 2,419,659 | 4/1947 | Sabor | 99—326UX |
| 2,642,794 | 6/1953 | Spiess et al. | 99—358 |
| 2,951,433 | 9/1960 | Steuber et al. | 99—358X |
| 3,024,344 | 3/1962 | Dills | 219—413X |
| 3,116,398 | 12/1963 | Welch | 219—413 |
| 3,410,988 | 11/1968 | Nagel | 219—412 |

WILLIAM I. PRICE, Primary Examiner

A. O. HENDERSON, Assistant Examiner